(12) United States Patent
Hettinger

(10) Patent No.: US 11,990,743 B2
(45) Date of Patent: May 21, 2024

(54) HALF-WAVE CONDITION DETECTION IN ELECTRICAL APPLIANCES

(71) Applicant: Haier US Appliance Solutions, Inc., Wilmington, DE (US)

(72) Inventor: Christopher Lee Hettinger, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/951,990

(22) Filed: Sep. 23, 2022

(65) Prior Publication Data

US 2024/0106227 A1 Mar. 28, 2024

(51) Int. Cl.
*H02H 7/08* (2006.01)
*H02H 7/085* (2006.01)

(52) U.S. Cl.
CPC .......... *H02H 7/0844* (2013.01); *H02H 7/085* (2013.01)

(58) Field of Classification Search
CPC .............................. H02H 7/0844; H02H 7/085
See application file for complete search history.

(56) References Cited

U.S. PATENT DOCUMENTS

| 10,536,991 B2 | 1/2020 | Novikov et al. |
| 2005/0168900 A1* | 8/2005 | Brochu .............. G05B 23/0235 361/93.1 |
| 2007/0097566 A1* | 5/2007 | Woods ..................... H02H 7/08 361/33 |
| 2015/0028877 A1* | 1/2015 | McCormick ......... H01H 47/226 324/418 |
| 2017/0025970 A1* | 1/2017 | Horst .................. H02M 7/1555 |

FOREIGN PATENT DOCUMENTS

| EP | 1576709 B1 | 9/2005 |
| JP | 06161567 A * | 6/1994 |
| JP | 2010025404 A | 2/2010 |

* cited by examiner

*Primary Examiner* — Scott Bauer
(74) *Attorney, Agent, or Firm* — Dority & Manning, P.A.

(57) ABSTRACT

Methods and systems for detecting a half-wave condition in an electrical appliance are disclosed herein. The method can include providing, by an electronic controller, an input signal to a triac circuit for controlling an electric motor, the triac circuit configured to control the electric motor, and receiving, by the electronic controller, a feedback signal from a feedback circuit indicative of an output of the triac circuit. The method can further include determining that the feedback signal indicates a half-wave condition is present, generating a shutdown signal for the electric motor, and providing the shutdown signal, by the electronic controller, to the triac circuit.

17 Claims, 5 Drawing Sheets

HALF-WAVE CONDITION DETECTION IN ELECTRICAL APPLIANCES

FIELD OF THE INVENTION

The present subject matter relates generally to triac control of motors in electrical appliances. In particular, the present subject matter relates to half-wave detection and damage prevention for motors used in electrical appliances.

BACKGROUND OF THE INVENTION

In electrical appliances, especially cooking appliances, it is becoming commonplace to vary the speed of both convection and cooling fan motors. The most cost-effective way of varying motor speeds for these motors is using a triac to pulse-width-modulate ("PWM") the alternating current ("AC") being supplied to the motor.

Shaded pole and permanent-split-capacitor ("PSC") motors are being widely used in cooking appliances because of the simplicity of the designs, the size of the motors, and the cost-efficiency of the use of the motors. In particular, PSC motors are being used where reversing motor directions is required.

Due to the nature of an AC signal, half of the time the voltage of the AC signal is a positive voltage and the other half of the time the voltage is negative. Triacs are designed to handle this condition, as most triacs generally include two silicon controlled rectifiers ("SCRs") wired back to back. One of the SCRs conducts during the positive half-cycle of the AC signal, and one conducts during the negative half-cycle of the AC signal.

Notably, however, these types of motors can be heavily damaged when powered by direct current ("DC") or half-wave AC power, even if only for a few seconds. One of the common failure modes of the triacs operating these motors is an AC half-wave condition. If the triac were to fail in a half-wave mode, windings of the motor can be rapidly overheated and burned out, because the impedance of the motor is very low for DC or half-wave AC current. Furthermore, there is no indication of this burnout until the motor begins to smoke and/or an unpleasant odor emanates.

Accordingly, a system and method for preventing these burnouts would be useful. More specifically, a system and method for detecting AC half-wave conditions from a failed triac circuit in appliances is desired.

BRIEF DESCRIPTION OF THE INVENTION

Aspects and advantages of the invention will be set forth in part in the following description, or may be obvious from the description, or may be learned through practice of the invention.

In one exemplary embodiment, a system for detecting a half-wave condition in an electrical appliance can be provided. The system can include an electric motor, a triac circuit electrically coupled to the electric motor, the triac circuit configured to control the electric motor, and a feedback circuit. The system can also include an electronic controller electrically coupled to the triac circuit and the feedback circuit. The electronic controller can include one or more processors and a non-transitory, computer readable medium comprising instructions that, when executed by the one or more processors, cause the one or more processors to perform a process. The process can include providing, by the electronic controller, an input signal to the triac circuit for controlling the electric motor and receiving, at the electronic controller, a feedback signal from the feedback circuit indicative of an output of the triac circuit. The process can further include determining that the feedback signal indicates a half-wave condition is present, generating a shutdown signal for the electric motor, and providing the shutdown signal, by the electronic controller, to the triac circuit.

In another exemplary embodiment, a method for detecting a half-wave condition in an electrical appliance can be provided. The method can include providing, by an electronic controller, an input signal to a triac circuit for controlling an electric motor, the triac circuit configured to control the electric motor, and receiving, by the electronic controller, a feedback signal from a feedback circuit indicative of an output of the triac circuit. The method can further include determining that the feedback signal indicates a half-wave condition is present, generating a shutdown signal for the electric motor, and providing the shutdown signal, by the electronic controller, to the triac circuit.

In a further exemplary embodiment, a non-transitory, computer-readable medium can be provided. The non-transitory, computer readable medium can include instructions that, when executed by one or more processors, cause the one or more processors to perform a process. The process can include providing, by an electronic controller, an input signal to a triac circuit for controlling an electric motor, the triac circuit configured to control the electric motor, and receiving, by the electronic controller, a feedback signal from a feedback circuit indicative of an output of the triac circuit. The process can also include determining that the feedback signal indicates a half-wave condition is present, generating a shutdown signal for the electric motor; and providing the shutdown signal, by the electronic controller, to the triac circuit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
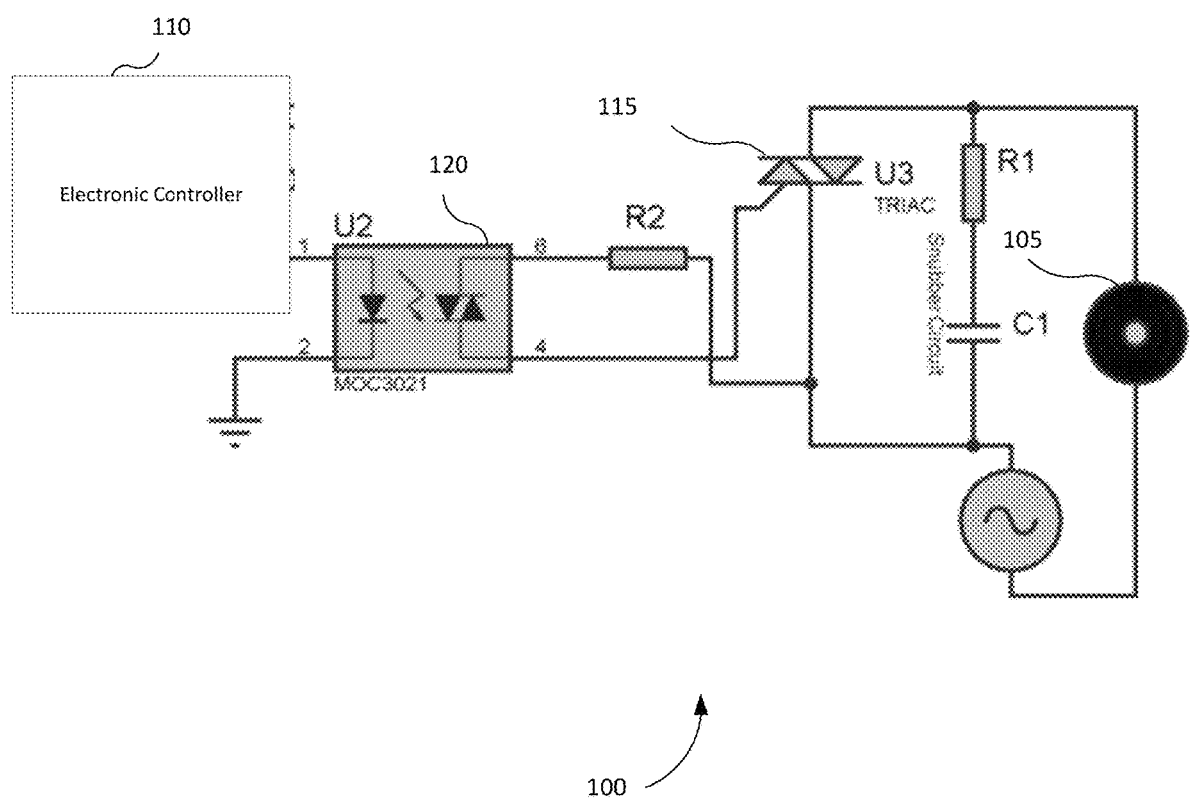
FIG. 1 provides a circuit schematic illustrating a triac circuit for controlling a motor of an electrical appliance according to example aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a circuit schematic illustrating a circuit 100 for controlling a motor 105 of an electrical appliance according to example aspects of the present disclosure. The circuit 100 can include an electronic controller 110, a triac circuit 115, and a triac driver circuit 120.

The motor 105 can be an electric motor configured to drive one or more components of the electrical appliance, such as a motor controlling various components of wall ovens, free-standing ovens, slide-in ovens, dishwashers, microwaves, and the like. In some embodiments, the motor 105 can be a shaded pole motor or a PSC motor. However, in other embodiments, the motor 105 can be any electric motor that can be driven by a PWM signal from a triac.

The electronic controller 110 can include one or more electronic processors, one or more non-transitory, computer-readable memories, and one or more input/output interfaces. For example, the electronic controller 110 can be a microcontroller, an application-specific integrated circuit ("ASIC"), a field-programmable gate array ("FPGA"), and the like. The one or more processors can access one or more instructions stored in the one or more non-transitory, computer-readable memories and, among other things, perform the methods, operations, and processes described herein. The one or more input/output interfaces can enable the electronic controller 110 to be electronically and/or communicatively coupled to other electrical components of the circuit 100, such as the triac driver circuit 120. In some embodiments, the electronic controller 110 can generate one or more signals and provide the one or more signals to various components of the circuit 100 using the one or more input/output interfaces.

The triac circuit 115 can be a three terminal AC switch that can includes two back-to-back connected SCRs. The triac circuit 115 is defined by its ability to conduct in both the positive and negative direction, which enables both positive and negative halves of an input AC voltage to be conducted across the triac circuit 115 when triggered by a gate pulse. The triac circuit 115 can be turned "on" or "off" (e.g., to allow or prevent conduction of a voltage through the triac circuit 115, respectively) by applying a gate voltage (positive or negative) to the triac circuit 115. Thus, the triac circuit 115 can operate as a switch for conducting AC power to a motor, such as the motor 105.

The triac driver circuit 120 can be electronically coupled to the electronic controller 110 and can be configured to generate a PWM AC power signal in response to receiving a signal from the electronic controller 110. The triac driver circuit 120 can also be electronically coupled to the triac circuit 115 and can provide the generated PWM AC power signal to the triac circuit 115, which in turn provides the PWM AC power signal to the motor 105.

Figure 2:
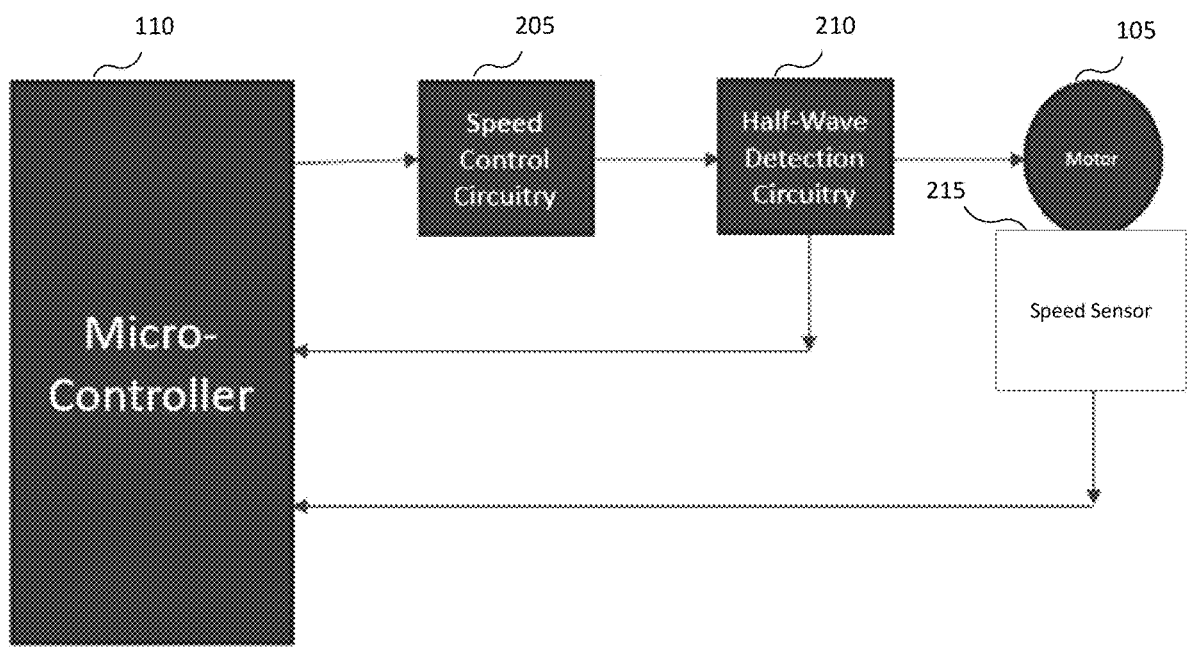
FIG. 2 provides a block diagram illustrating a general control scheme for a motor in a cooking appliance according to example aspects of the present disclosure.

FIG. 2 provides a block diagram 200 illustrating a general control scheme for the motor 105 in a cooking appliance according to example aspects of the present disclosure.

In some embodiments, the electronic controller 110 can be electrically coupled to speed control circuitry 205, such as the triac driver circuit 120 and the triac circuit 115. Speed control circuitry 205 is configured to output an AC signal to the motor 105 to operate the motor 105 at a particular speed or under various conditions. The output AC signal can have a set amplitude, frequency, and other AC signal characteristics for operating the motor 105 at the particular speed.

In some embodiments, the electronic controller 110 can also be electronically coupled to half-wave detection circuitry 210. Half-wave detection circuitry 210 detects half-waves of the input AC signal provided through the speed control circuitry 205. Because the speed control circuitry 205 can include the triac circuit 115, half-wave detection circuitry 210 can see both the positive and the negative halves of the input AC signal. If both the positive and the negative half-waves of the input AC signal are present in a current cycle, the half-wave detection circuitry takes no action, as the speed control circuitry 205 is operating correctly. However, if at least one of the positive and negative half-waves in one cycle is not detected by half-wave detection circuitry 210, half-wave detection circuitry 210 can send an indication signal immediately to the electronic controller 110 indicating to stop the supply of the input AC signal to avoid damage to the motor 105. Additional details regarding the detection of half-waves can be found below in relation to FIG. 3.

In some embodiments, the electronic controller 110 can be electrically coupled to a motor speed sensor 215. The motor speed sensor 215 can be configured to detect a speed of the motor 105 and provide a signal to the electronic controller 110 indicative of the speed of the motor 105. In some embodiments, the electronic controller 110 can detect one or more faults in the motor 105 based on a desired speed (e.g., based on an expected speed given the input AC signal from the speed control circuitry 205). For example, if the detected speed from the motor speed sensor 215 does not match the expected speed given the input AC signal from the speed control circuitry 205, the electronic controller 110 can be configured to shut down the motor 105 (e.g., generate a signal to the speed control circuitry 205 to stop providing the input AC signal from the speed control circuitry 205 to the motor 105), provide a warning about the fault via a display of the cooking appliance, and the like.

Figure 3:
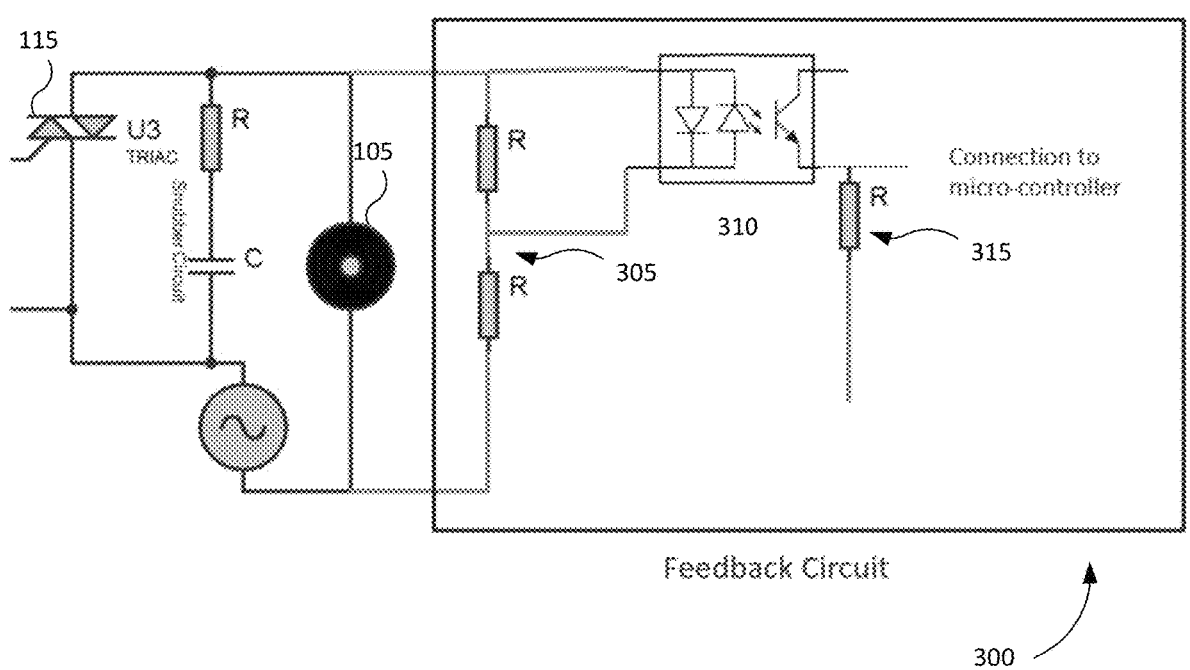
FIG. 3 provides a circuit schematic illustrating a feedback circuit for detecting a half-wave condition of a triac according to example aspects of the present disclosure.

FIG. 3 provides a circuit schematic illustrating a feedback circuit 300 for detecting a half-wave condition of a triac according to example aspects of the present disclosure. The feedback circuit 300 can include a voltage divider network 305, an optocoupler 310, and a tie-down resistor 315.

The voltage divider network 305 is electrically coupled in parallel with the triac circuit 115 and the optocoupler 310. The voltage divider network 305 can be used to scale down a high voltage, such as the input AC signal for powering the motor 105, to enable the optocoupler 310 to observe the half-waves of the input AC signal (as described below) at a voltage compatible with the optocoupler 310. For example, the optocoupler 310 may include diodes that operate in a voltage range of 1.5 volts to 12 volts. The voltage divider network 305 can take the input AC signal, reduce the voltage of the input AC signal, and provide the reduced voltage input AC signal to the optocoupler 310 to observe the half-waves of the input AC signal at a voltage compatible with the optocoupler 310.

The optocoupler 310 is configured to observe the voltage-reduced input AC signal to observe the positive and the negative half-waves of the voltage-reduced input AC signal. This can be accomplished, for example, by a light-emitting diode ("LED") of the optocoupler 310 converting the input AC signal into light, which is then observed by a photosensor (such as an SCR or a triac). In some embodiments, the optocoupler 310 can be a dual-channel optocoupler, which enables both the positive half-wave and the negative half-wave of the input AC signal to be observed. While both channels of the optocoupler 310 are observed (e.g., signal is properly passing through and light is being detected for both the positive and negative half-waves), the optocoupler 310 can generate and output a feedback signal indicating that the triac circuit 115 is properly operating.

However, if only one of the positive and negative half-waves are detected, the optocoupler 310 can generate and output a feedback signal indicating that the triac circuit 115 is operating in a half-wave condition. If the triac circuit 115 is allowed to continue to operate in a half-wave condition for longer than a few seconds, damage could be caused to the motor 105. Therefore, optocoupler 310 observes every positive and negative half-wave of every cycle of the input AC signal and, in response to the half-wave condition being detected, immediately generates a feedback signal indicating that the half-wave condition is present and outputs the feedback signal to the electronic controller 110.

The feedback circuit 300 can also include the tie-down resistor 315. In some embodiments, the tie-down resistor 315 is electrically coupled to the optocoupler 310 and the electronic controller 110. The tie-down resistor 315 helps to prevent an undefined or unwanted output from being provided to the electronic controller 110 during operation of the optocoupler 310.

Figure 4:
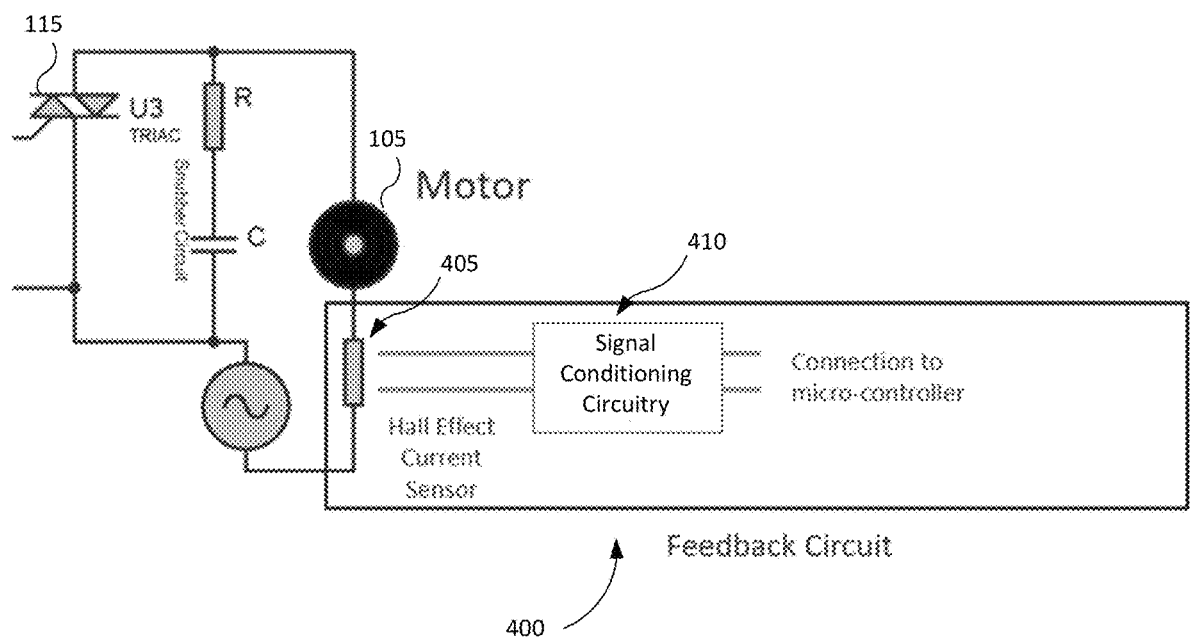
FIG. 4 provides a circuit schematic illustrating an alternative feedback circuit for detecting a half-wave condition of a triac according to example aspects of the present disclosure.

FIG. 4 provides a circuit schematic illustrating an alternative feedback circuit 400 for detecting a half-wave condition of a triac according to example aspects of the present disclosure. The alternative feedback circuit 400 can include a current sensor 405 and signal conditioning circuitry 410.

The current sensor 405 can detect an electrical current of the motor 105. In some embodiments, the current sensor 405 can be a Hall effect current sensor, which can detect a magnetic field induced around a conducting wire currently conducting an electrical current. A Hall effect current sensor can then output an AC signal representative of the current passing through the motor 105.

The signal conditioning circuitry 410 can be electronically coupled to the current sensor 405 and the electronic controller 110. The signal conditioning circuitry 410 is configured to receive the AC signal representative of the current passing through the motor 105 from the current sensor 405 and "condition" the received signal such that the signal is usable by the electronic controller 110. For example, the signal conditioning circuitry 410 can take the AC signal received from the current sensor 405 and convert the AC signal into a digital signal or a direct current ("DC") signal representative of the current in the motor 105. This digital signal or DC signal can then be provided by the signal conditioning circuitry 410 to the electronic controller 110.

Figure 5:
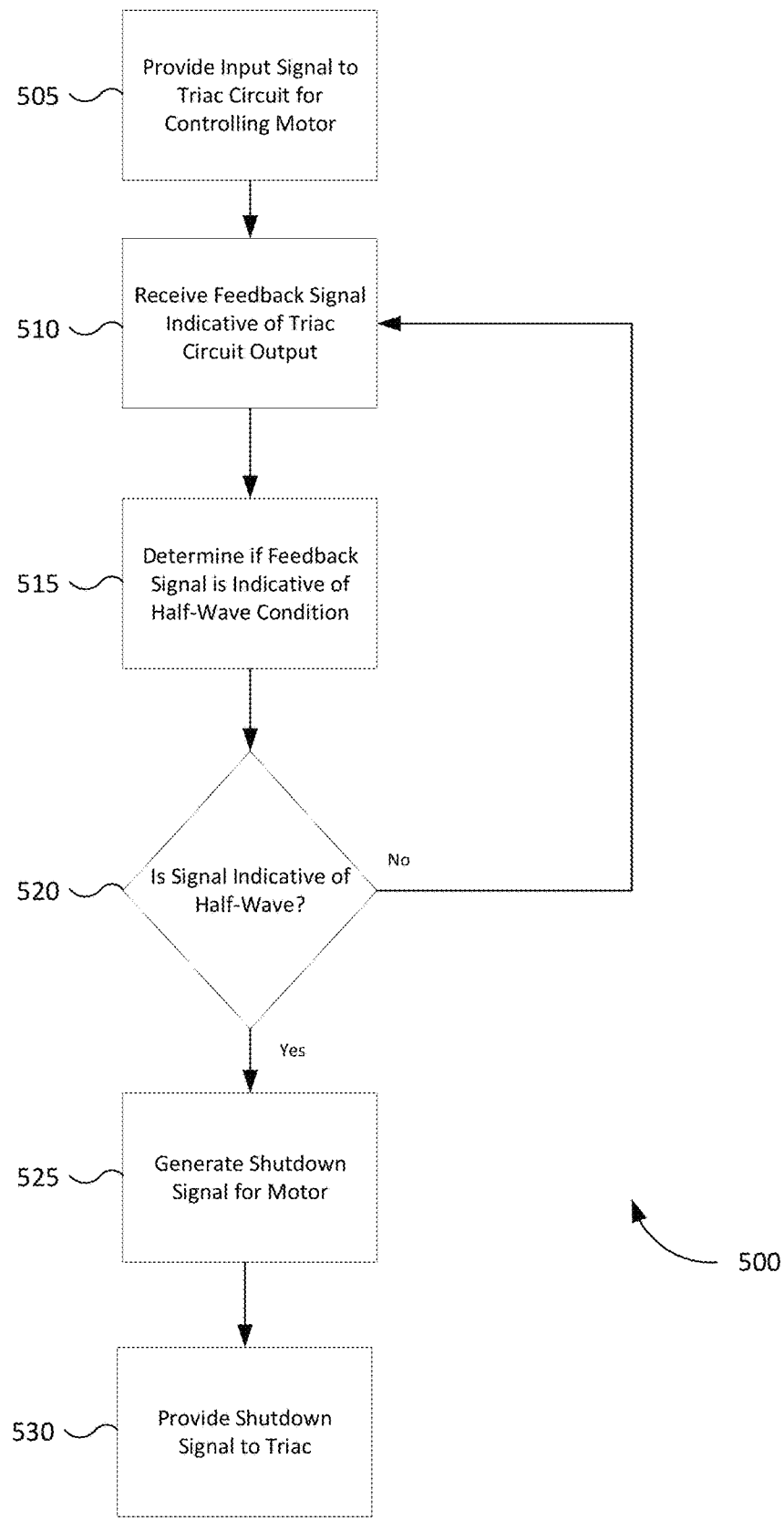
FIG. 5 provides a flow chart of a method for detecting a half-wave condition of a triac according to example aspects of the present disclosure.

FIG. 5 provides a flow chart of a method 500 for detecting a half-wave condition of a triac according to example aspects of the present disclosure. In some embodiments, the method 500 can be stored as instructions on a non-transitory, computer-readable memory and can be performed when one or more processors access the instructions, such as being performed when one or more processors of the electronic controller 110 access the instructions.

At block 505, the method 500 can include providing, by the electronic controller 110, an input signal to the triac circuit 115. In some embodiments, the electronic controller 110 can generate a control signal for the triac circuit 115 and provide the control signal directly to the triac circuit 115. In other embodiments, the electronic controller 110 can generate a control signal for the triac driver circuit 120, which in turn provides a control signal to the triac circuit for operating the motor 105.

In some embodiments, the input signal can specify one or more parameters for the triac circuit 115. For example, the one or more parameters can include a frequency of an output PWM signal from the triac circuit 115 for operating the motor 105, an amplitude of the output PWM signal, and the like. Based on the one or more parameters, the triac circuit 115 can output the PWM signal to the motor 105.

At block 510, the method 500 can include receiving, by the electronic controller 110, a feedback signal indicative of an output of the triac circuit 115. In some embodiments, the feedback signal can be generated and sent by the optocoupler 310 or the signal conditioning circuitry 410. As described above with regards to FIGS. 3 and 4, the optocoupler 310 and the signal conditioning circuitry 410 can provide feedback signals indicative of the output of the triac circuit 115 (e.g., by monitoring the half-waves of the output signal of the triac circuit 115 or by monitoring the current operating the motor 105).

At block 515, the method 500 can include determining, by the electronic controller 110, if the feedback signal is indicative of a half-wave condition existing in the triac circuit 115. In one example, if the optocoupler 310 does not observe a half wave in a cycle, the resulting output of the optocoupler 310 is indicative of a half-wave condition existing (e.g., the output being logical low). In another example, if the output signal from the signal conditioning circuitry 410 alternates between logical high and logical low in a cycle, the output signal can be indicative that the motor 105 is only receiving one half-wave from the triac circuit 115.

If the electronic controller 110 determines that the feedback signal is not indicative of a half-wave condition existing ("No" at block 520), the method 500 returns to receiving the feedback signal at block 510. If the electronic controller 110 determines that the feedback signal is indicative of the half-wave condition existing ("Yes" at block 520), the method 500 proceeds on to the next step.

At block 525, the method 500 includes generating, at the electronic controller 110, a shutdown signal for the triac circuit 115. As mentioned above, motors can be heavily damaged when powered by direct current ("DC") or half-wave AC power, even if only for a few seconds. One of the common failure modes of the triac circuit 115 operating these motors is an AC half-wave condition. If the triac circuit 115 were to fail in a half-wave mode, windings of the motor 105 can be rapidly overheated and burned out, because the impedance of the motor is very low for DC or half-wave AC current. Furthermore, there is no indication of this burnout until the motor 105 begins to smoke and/or an unpleasant odor emanates. Therefore, it is critical that the electronic controller 110 immediately generate the shutdown signal after one half-wave condition is detected.

At block 530, the method 500 can include providing, by the electronic controller 110, the shutdown signal to the triac circuit 115. In some embodiments, the electronic controller 110 provides the shutdown signal directly to the triac circuit 115. In other embodiments, the electronic controller 110 can provide the shutdown signal to the triac driver circuit 120, which in turn stops providing an input into the triac circuit 115.

In some embodiments, the method 500 can further include generating, by the electronic controller 110, a signal for a display of the cooking appliance indicating that the half-wave condition has been detected and that operation of the motor 105 has been ceased. For example, the signal can be provided to a display to show a message such as "ERROR" or "HALF-WAVE" or a similar message, or for less complex displays, simply display "ERR" or "!" or another indication that a fault has been detected.

As used herein, the terms "first," "second," and "third" may be used interchangeably to distinguish one component from another and are not intended to signify location or importance of the individual components. In addition, the term "or" is generally intended to be inclusive (i.e., "A or B" is intended to mean "A or B or both"). Furthermore, as used herein, terms of approximation, such as "approximately," "substantially," or "about," refer to being within a ten percent margin of error.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting a half-wave condition in an electrical appliance, the system comprising:
    an electric motor;
    a triac circuit electrically coupled to the electric motor, the triac circuit configured to control the electric motor;
    a feedback circuit, the feedback circuit comprising
        a dual-channel optocoupler electrically coupled to the triac circuit and the electronic controller, and
    an electronic controller electrically coupled to the triac circuit and the feedback circuit, the electronic controller comprising:
        one or more processors and a non-transitory, computer readable medium comprising instructions that, when executed by the one or more processors, cause the one or more processors to perform a process, the process comprising:
            providing, by the electronic controller, an input signal to the triac circuit for controlling the electric motor;
            receiving, at the electronic controller, a feedback signal from the feedback circuit indicative of an output of the triac circuit, wherein the dual-channel optocoupler observes the output of the triac circuit;
            determining that the feedback signal indicates a half-wave condition is present when the dual-channel optocoupler observes only one of a positive half-wave and a negative half-wave of the output of the triac circuit;
            generating a shutdown signal for the electric motor; and
            providing the shutdown signal, by the electronic controller, to the triac circuit.

2. The system of claim 1, wherein the process further comprises:
    generating, by the electronic controller, an error message; and
    providing, by the electronic controller, the error message to a display component of the system.

3. The system of claim 1, wherein the feedback circuit further comprises:
    a voltage divider circuit electrically coupled to the triac circuit and the dual-channel optocoupler.

4. The system of claim 3, wherein
    the dual-channel optocoupler receives a voltage-divided signal from the triac circuit, the voltage-divided signal being reduced by the voltage divider circuit.

5. The system of claim 1, wherein the feedback circuit further comprises:
    a current sensor electrically coupled to the motor; and
    a signal conditioning circuit electrically coupled to the current sensor and the electronic controller.

6. The system of claim 5, wherein the signal conditioning circuit is configured to receive a current signal from the current sensor;
    determine one or more characteristics of the current signal; and
    output the feedback signal to the electronic controller based on the one or more characteristics of the current signal.

7. The system of claim 5, wherein the current sensor is a Hall effect current sensor.

8. The system of claim 1, wherein the electric motor is one of a shaded pole motor and a permanent-split-capacitor motor.

9. A method for detecting a half-wave condition in an electrical appliance, the method comprising:
    providing, by an electronic controller, an input signal to a triac circuit for controlling an electric motor, the triac circuit configured to control the electric motor;
    receiving, by the electronic controller, a feedback signal from a feedback circuit indicative of an output of the triac circuit, wherein a dual-channel optocoupler of the feedback circuit observes the output of the triac circuit;
    determining that the feedback signal indicates a half-wave condition is present when the dual-channel optocoupler observes only one of a positive half-wave and a negative half-wave of the output of the triac circuit;
    generating a shutdown signal for the electric motor; and
    providing the shutdown signal, by the electronic controller, to the triac circuit.

10. The method of claim 9, wherein the feedback circuit further comprises:
    a voltage divider circuit electrically coupled to the triac circuit and the dual-channel optocoupler.

11. The method of claim 10, wherein
    the dual-channel optocoupler receives a voltage-divided signal from the triac circuit, the voltage-divided signal being reduced by the voltage divider circuit.

12. The method of claim 9, wherein the feedback circuit further comprises:
    a current sensor electrically coupled to the motor; and
    a signal conditioning circuit electrically coupled to the current sensor and the electronic controller.

13. The method of claim 12, wherein the signal conditioning circuit is configured to receive a current signal from the current sensor;
    determine one or more characteristics of the current signal; and output the feedback signal to the electronic controller based on the one or more characteristics of the current signal.

14. A non-transitory, computer-readable medium comprising instructions that, when executed by one or more processors, cause the one or more processors to perform a process, the process comprising:
providing, by an electronic controller, an input signal to a triac circuit for controlling an electric motor, the triac circuit configured to control the electric motor;
receiving, by the electronic controller, a feedback signal from a feedback circuit indicative of an output of the triac circuit s wherein a dual-channel optocoupler of the feedback circuit observes the output of the triac circuit;
determining that the feedback signal indicates a half-wave condition is present when the dual-channel optocoupler observes only one of a positive half-wave and a negative half-wave of the output of the triac circuit;
generating a shutdown signal for the electric motor; and
providing the shutdown signal, by the electronic controller, to the triac circuit.

15. The non-transitory, computer-readable medium of claim 14, wherein the feedback circuit comprises:
a voltage divider circuit electrically coupled to the triac circuit and the dual-channel optocoupler;
wherein the dual-channel optocoupler receives a voltage-divided signal from the triac circuit, the voltage-divided signal being reduced by the voltage divider circuit.

16. The non-transitory, computer-readable medium of claim 14, wherein the feedback circuit further comprises:
a current sensor electrically coupled to the motor; and
a signal conditioning circuit electrically coupled to the current sensor and the electronic controller, wherein the signal conditioning circuit is configured to receive a current signal from the current sensor;
determine one or more characteristics of the current signal; and
output the feedback signal to the electronic controller based on the one or more characteristics of the current signal.

17. The non-transitory, computer-readable medium of claim 14, wherein the electric motor is one of a shaded pole motor and a permanent-split-capacitor motor.

\* \* \* \* \*